US010839198B2

(12) United States Patent
Gunji (10) Patent No.: US 10,839,198 B2
(45) Date of Patent: Nov. 17, 2020

(54) IMAGE PROCESSING APPARATUS, IMAGE PROCESSING METHOD, AND PROGRAM (71) Applicant: CANON KABUSHIKI KAISHA, Tokyo (JP)

(72) Inventor: Daisuke Gunji, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 106 days.

(21) Appl. No.: 15/935,282

(22) Filed: Mar. 26, 2018

(65) Prior Publication Data
US 2018/0285627 A1 Oct. 4, 2018

(30) Foreign Application Priority Data

Mar. 31, 2017 (JP) ................. 2017-072560

(51) Int. Cl.
G06K 9/68 (2006.01)
G06T 7/246 (2017.01)
G06K 9/46 (2006.01)
G06K 9/00 (2006.01)
G06K 9/32 (2006.01)

(52) U.S. Cl.
CPC ..... *G06K 9/00261* (2013.01); *G06K 9/00255* (2013.01); *G06K 9/00275* (2013.01); *G06K 9/00288* (2013.01); *G06K 9/4652* (2013.01); *G06K 9/68* (2013.01); *G06T 7/246* (2017.01); *G06K 2009/3291* (2013.01); *G06T 2207/10016* (2013.01); *G06T 2207/30201* (2013.01)

(58) Field of Classification Search
USPC .......................... 382/103–104, 100; 701/519
See application file for complete search history.

(56) References Cited

U.S. PATENT DOCUMENTS 5,706,362 A * 1/1998 Yabe ..................... G01S 3/7865
348/149
7,756,296 B2 * 7/2010 Porikli ..................... G06T 7/20
348/42
2003/0179193 A1* 9/2003 Adams, Jr. ............ G06T 15/205
345/419

(Continued)

FOREIGN PATENT DOCUMENTS

JP 2007-020105 A 1/2007

*Primary Examiner* — Dwayne D Bost
*Assistant Examiner* — Stephen M Brinich
(74) *Attorney, Agent, or Firm* — Cowan, Liebowitz & Latman, P.C.

(57) ABSTRACT

There are provided an object recognition unit of recognizing a target object in sequentially acquired images, a tracking unit of performing tracking on the sequentially acquired images for the recognized target object, and a storage controller of controlling so as to store in a first storage device the sequentially acquired images. The tracking unit further performs tracking for the target object on stored images, that are acquired before the target object is recognized by the object recognition unit in the sequentially acquired images, and are stored in the first storage device. The storage controller controls so as to store in a second storage device different from the first storage device, images in which the target object is tracked by the tracking unit of the sequentially acquired images, and images in which the target object is tracked by the tracking unit of the stored images.

17 Claims, 8 Drawing Sheets

(56) References Cited

U.S. PATENT DOCUMENTS

| | | | |
|---|---|---|---|
| 2008/0130950 A1* | 6/2008 | Miklos | G06F 3/013 382/103 |
| 2013/0057728 A1* | 3/2013 | Ushijima | G03B 13/36 348/231.99 |
| 2014/0320664 A1* | 10/2014 | Hyun | G06K 9/00295 348/159 |

* cited by examiner

IMAGE PROCESSING APPARATUS, IMAGE PROCESSING METHOD, AND PROGRAM

BACKGROUND OF THE INVENTION

Field of the Invention

The present invention relates to an image processing apparatus, an image processing method, and a program.

Description of the Related Art

In the related art, there has been proposed a technology involving registering a face image in advance, executing face recognition on an image to be recorded that has been acquired by an image pickup apparatus, and recording the image to be recorded in a recording medium when an extracted face image satisfies photographic conditions (orientation of the face, opening or closing of the eyes, line of sight, and the like) (Japanese Patent Application Laid-Open No. 2007-20105).

However, with the related art, the image is recordable only when the face image that has been extracted with use of a face authentication technology satisfies the photographic conditions.

SUMMARY OF THE INVENTION

According to one aspect of the present invention, there is provided an image processing apparatus, comprising: an acquisition unit configured to sequentially acquire images; an object recognition unit configured to recognize a target object in the images sequentially acquired by the acquisition unit; a tracking unit configured to perform tracking on the images sequentially acquired by the acquisition unit for the target object recognized by the object recognition unit; and a storage controller configured to control so as to store in a first storage device the images sequentially acquired by the acquisition unit, wherein the tracking unit further performs tracking for the target object on stored images, that are acquired by the acquisition unit before the target object is recognized by the object recognition unit in the images sequentially acquired by the acquisition unit, and are stored in the first storage device, and wherein the storage controller controls so as to store in a second storage device that is different from the first storage device, images in which the target object is tracked by the tracking unit of the images sequentially acquired by the acquisition unit, and images in which the target object is tracked by the tracking unit of the stored images.

According to another aspect of the present invention, there is provided an image processing method, comprising: sequentially acquiring images; recognizing a target object in the images sequentially acquired in the sequentially acquiring; performing tracking on the images sequentially acquired in the sequentially acquiring for the target object recognized in the recognizing; controlling so as to store in a first storage device the images sequentially acquired in the sequentially acquiring; performing tracking for the target object on stored images, that are acquired before the target object is recognized in the sequentially acquired images, and have been stored in the first storage device; and storing in a second storage device that is different from the first storage device, images in which the target object is tracked of the sequentially acquired images, and images in which the target object is tracked in the stored images.

According to still another aspect of the present invention, there is provided a program for causing a computer to execute: sequentially acquiring images; recognizing a target object in the images sequentially acquired in the sequentially acquiring; performing tracking on the images sequentially acquired in the sequentially acquiring for the target object recognized in the recognizing; controlling so as to store in a first storage device the images sequentially acquired in the sequentially acquiring; performing tracking for the target object on stored images, that are acquired before the target object is recognized in the sequentially acquired images, and have been stored in the first storage device; and storing in a second storage device that is different from the first storage device, images in which the target object is tracked of the sequentially acquired images, and images in which the target object is tracked in the stored images.

Further features of the present invention will become apparent from the following description of exemplary embodiments with reference to the attached drawings.

DESCRIPTION OF THE EMBODIMENTS

Exemplary embodiments of the present invention are hereinafter described in detail with reference to the attached drawings. The present invention is not limited to the embodiments below.

First Embodiment

Figure 1:
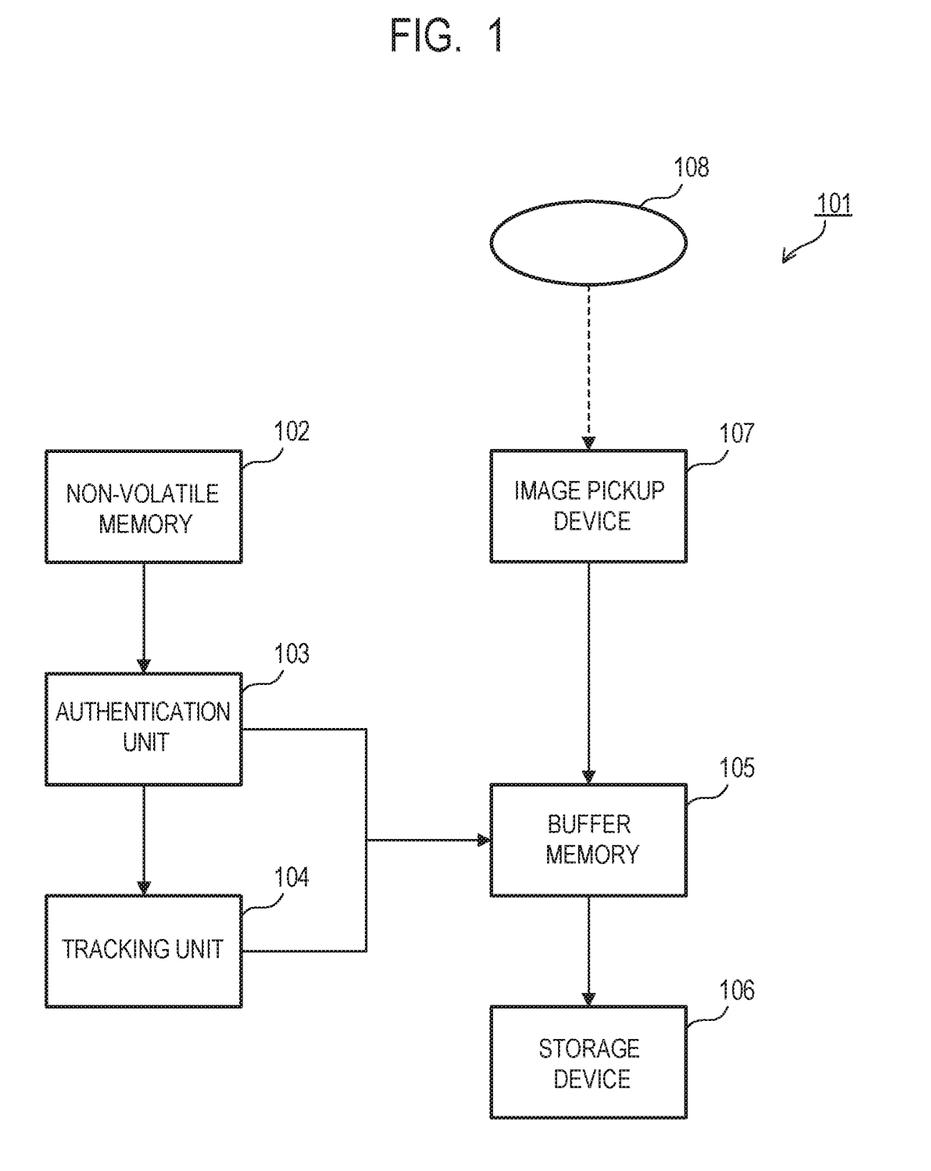
FIG. 1 is a block diagram for illustrating an image processing apparatus according to a first embodiment of the present invention.

An image processing apparatus and an image processing method according to a first embodiment of the present invention are described with reference to the drawings. FIG. 1 is a block diagram for illustrating the image processing apparatus according to the first embodiment. Description is given here of an example of a case in which an image processing apparatus 101 according to the first embodiment is an electronic camera, that is, a digital camera, which is capable of acquiring a moving image and a still image, but the present invention is not limited thereto. For example, the image processing apparatus 101 may be a digital video camera, or a smart phone, which is an electronic device having both of a function of a personal digital assistant and a function of a mobile phone. Moreover, the image processing apparatus 101 may be a tablet terminal or a personal digital assistant (PDA), for example.

As illustrated in FIG. 1, the image processing apparatus 101 according to the first embodiment includes a non-volatile memory 102, an authentication unit 103, a tracking unit 104, a buffer memory 105, and an image pickup device 107. The image processing apparatus 101 also includes a controller (not shown), which is configured to control respective units. The image processing apparatus 101 includes an image pickup optical system 108, that is, a lens unit. The image pickup device 107 includes an image pickup unit, which is configured to take an optical image formed with use of the image pickup optical system 108. As the image pickup unit, a CMOS image sensor is used, for example. The image pickup device (acquisition unit) 107 is configured to convert object light, which is caused to form an image by a lens, into an electrical signal by the image pickup unit, perform noise reduction processing, for example, to sequentially acquire image data, and output the image data. The image pickup optical system 108 may or may not be removable from the image processing apparatus 101. The image processing apparatus 101 includes a storage device 106. The storage device 106 may or may not be removable from the image processing apparatus 101.

In the non-volatile memory 102, identification information for identifying an object is stored in advance as a database. Here, a case in which the object is a person, and in which the object is identified by face authentication is described as an example. As the identification information, a face image of the person is used, for example. For example, a face image of a person on which to focus is registered as the identification information with the non-volatile memory 102.

The authentication unit (object recognition unit) 103 is configured to authenticate the object. The authentication unit 103 is configured to authenticate the object by face authentication, for example. The authentication unit 103 is configured to authenticate the object based on the face image that has been registered in advance. The authentication unit 103 extracts, from within an image acquired by the image pickup device 107, a portion that is estimated to be the face, and compares the portion to the face image registered with the non-volatile memory 102 to perform face authentication. Here, the case in which the object is a person has been described as an example, but the object may be an object other than a person. Moreover, the case in which object recognition is performed with use of face authentication is described here as an example. However, a method of recognizing the object is not limited to face authentication, and any other object recognition method may be used as appropriate.

The tracking unit 104 is configured to perform tracking for the object authenticated by the authentication unit 103. The tracking unit 104 is capable of tracking the object included in images that have been acquired by the image pickup device 107 before a time point at which the object is authenticated by the authentication unit 103 and have already been stored in the buffer memory 105. The tracking unit 104 is configured to perform tracking for the object backward in chronological order, that is, going back in time, starting from a time point at which the object is authenticated by the authentication unit 103 in an image that has most recently been acquired by the image pickup device 107. In other words, the tracking unit 104 performs object tracking not only in chronological order on images sequentially acquired by the image pickup device 107, but also in reverse chronological order on images that have been acquired in the past and have been recorded in the buffer. Stated differently, the tracking unit 104 performs tracking for the object in order from the most recent image to less recent images of the images that have been acquired by the image pickup device 107 before the time point at which the object is authenticated by the authentication unit 103 and have already been stored in the buffer memory 105. When an image at the time when the object authenticated by the authentication unit 103 has started being photographed is present in the buffer memory 105, the tracking unit 104 performs tracking back to the image, that is, the frame. When the image at the time when the object authenticated by the authentication unit 103 has started being photographed is not present in the buffer memory 105, tracking is performed back to the least recent image, that is, the least recent frame.

The tracking unit 104 tracks the face of the object authenticated by the authentication unit 103 and a portion other than the face that is estimated based on the face. The tracking unit 104 performs tracking as long as the object authenticated by the authentication unit 103, that is, the person having his/her face registered, is estimated to be included in image data. For example, the tracking unit 104 detects the face portion of the object authenticated by the authentication unit 103, that is, a movement locus of a face region, and determines a skin-color region located on an extended line of the movement locus as the face of the object to perform tracking. Stated differently, the tracking unit 104 determines, as a target object, an object that is located on the extended line of the locus of the object authenticated by the authentication unit 103, and that satisfies a predetermined condition, and tracks the target object. In this manner, the object can be tracked back to a frame that has been failed in face authentication of the object because the face region was small, for example. Moreover, the tracking unit 104 can also determine an object that is located substantially at the same point as that of the object authenticated by the authentication unit 103 and that is similar to the object in size, shape, and other feature to be the object, and perform tracking for the object. Stated differently, the tracking unit 104 can determine an object having differences in position and shape that are within a predetermined level from the object authenticated by the authentication unit 103 to be the target object, and track the target object. In this manner, for example, the object can be tracked back to a frame that has been failed in face authentication because the object was facing back and the face was hidden. When the object authenticated by the authentication unit 103 is included in an image, the tracking unit 104 generates metadata containing information indicating that the object is included, and information indicating that the image is an image extracted in tracking by the tracking unit 104. The thus-generated metadata is stored in the storage device 106 in association with the image when the image is stored in the storage device 106. Tracking of the object in images acquired after the object is authenticated by the authentication unit 103 may be performed by the tracking unit 104 or by the authentication unit 103.

The buffer memory (first storage device) 105 is used as a ring buffer. In the buffer memory 105, each of a plurality of images, that is, each of a plurality of frames, forming a moving image acquired by the image pickup device 107 is stored temporarily. The images, that is, the image data, sequentially stored in the buffer memory 105 may be copied or moved to the storage device 106. When free memory space is available in the buffer memory 105, the image data is sequentially stored in the free memory space. When no more free memory space is available in the buffer memory 105, the buffer memory 105 is used as a ring buffer, and old image data is sequentially overwritten with new image data.

The storage device (second storage device) 106 is configured to permanently store the image data and other such data. Of the image data stored in the buffer memory 105, image data that is required to be permanently stored is stored in the storage device 106. In this manner, the image data acquired by the image pickup device 107 is recorded in the storage device 106 via the buffer memory 105.

Figure 2:
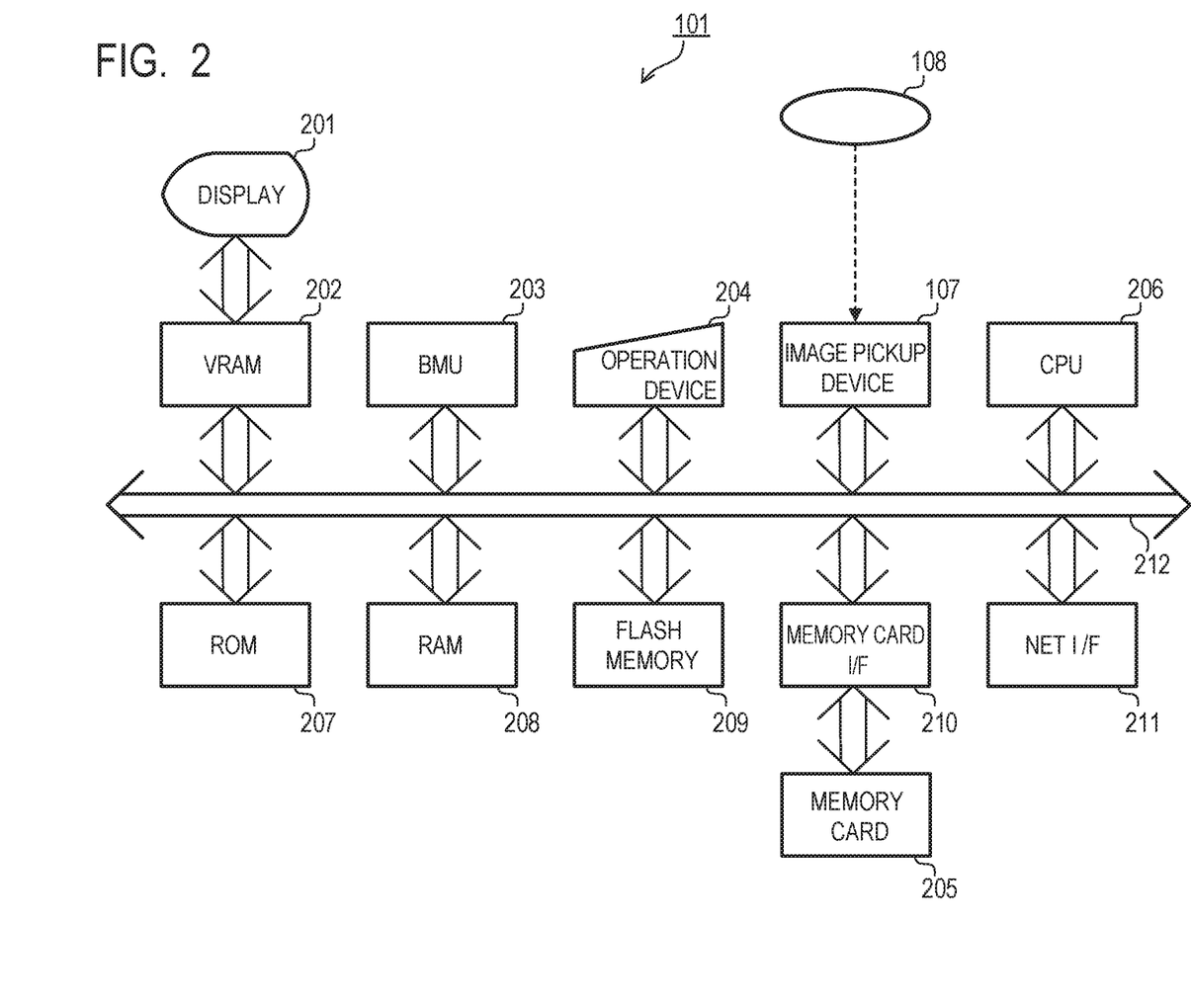
FIG. 2 is a block diagram for illustrating the image processing apparatus according to the first embodiment.

FIG. 2 is a block diagram for illustrating the image processing apparatus according to the first embodiment.

The image processing apparatus 101 includes a display 201, a video RAM (VRAM) 202, a bit move unit (BMU) 203, an operation device 204, the image pickup device 107, and a central processing unit (CPU) 206. The image processing apparatus 101 further includes a read only memory (ROM) 207, a random access memory (RAM) 208, and a flash memory 209. The image processing apparatus 101 further includes a memory card interface (memory card I/F) 210, a network interface (network I/F, NET I/F) 211, and a bus 212. The image processing apparatus 101 includes the image pickup optical system 108 as described above. As described above, the image pickup optical system 108 may or may not be removable from the image processing apparatus 101. The memory card I/F 210 is included in a memory card slot (not shown) included in the image processing apparatus 101. To the memory card slot, a memory card 205 is mountable. The image data and other such data are written to and read from the memory card 205 via the memory card I/F 210.

On the display 201, user interface information for operating the image processing apparatus 101 according to the first embodiment is displayed, for example. Examples of the user interface information include an icon, a message, and a menu. Examples of the display 201 include a liquid crystal monitor, but the present invention is not limited thereto. The display 201 may be formed integrally with the image processing apparatus 101, or may be formed separately from the image processing apparatus 101. When the display 201 is formed integrally with the image processing apparatus 101, a display screen of the display 201 corresponds to a display screen of the image processing apparatus 101.

In the VRAM 202, image data used in displaying the screen of the display 201 is temporarily stored. The image data stored in the VRAM 202 is transferred to the display 201 in accordance with a predetermined method to display an image on the display 201.

The BMU 203 is configured to control data transfer between memories, and data transfer between a memory and each I/O device, for example. Examples of the data transfer between the memories include data transfer between the VRAM 202 and another memory. Examples of the data transfer between the memory and each I/O device include data transfer between the memory and the network I/F 211.

The operation device 204 is used to input various operations, and includes a button and a switch, for example. Examples of the button include a power button, an instruction button, a menu display button, and an enter button. Examples of the switch include a change-over switch. Moreover, all types of operating elements such as a cursor key, a pointing device, a touch panel, and a dial may be used as the operation device 204. Operating members of the operation device 204 may be embodied by various functional icons displayed on the display 201. A user may perform an operation by selecting one of those functional icons as appropriate.

The CPU (controller, storage controller) 206 is configured to control the entire image processing apparatus 101, and control each functional block based on a computer program (control program) for controlling the image processing apparatus 101 according to the first embodiment. The computer program is stored in the ROM 207 or the flash memory 209, for example.

The ROM 207 stores various computer programs and data, for example. The RAM 208 may function as a work area for the CPU 206, a data save area at the time of error processing, and an area for loading the computer programs, for example. The flash memory 209 records the various computer programs executed by the image processing apparatus 101, and the data temporarily stored in the RAM 208, for example. The memory card 205 records the data temporarily stored in the RAM 208 or the flash memory 209, for example.

The network I/F 211 is used for communication to/from another information processing device, a printer, and other such devices via a network. The bus 212 includes an address bus, a data bus, and a control bus. The computer programs may be provided to the CPU 206 from the ROM 207, the flash memory 209, or the memory card 205, or from another information processing apparatus through a network via the network I/F 211. A solid state drive (SSD) or the like may be provided instead of the flash memory 209.

The non-volatile memory 102 described above with reference to FIG. 1 may be embodied by the flash memory 209 illustrated in FIG. 2, for example. The authentication unit 103 and the tracking unit 104 described above with reference to FIG. 1 may be embodied by the CPU 206 illustrated in FIG. 2, for example. The storage device 106 described above with reference to FIG. 1 may be embodied by the memory card 205 illustrated in FIG. 2, for example. The buffer memory 105 described above with reference to FIG. 1 may be embodied by the flash memory 209, for example.

Figure 3:
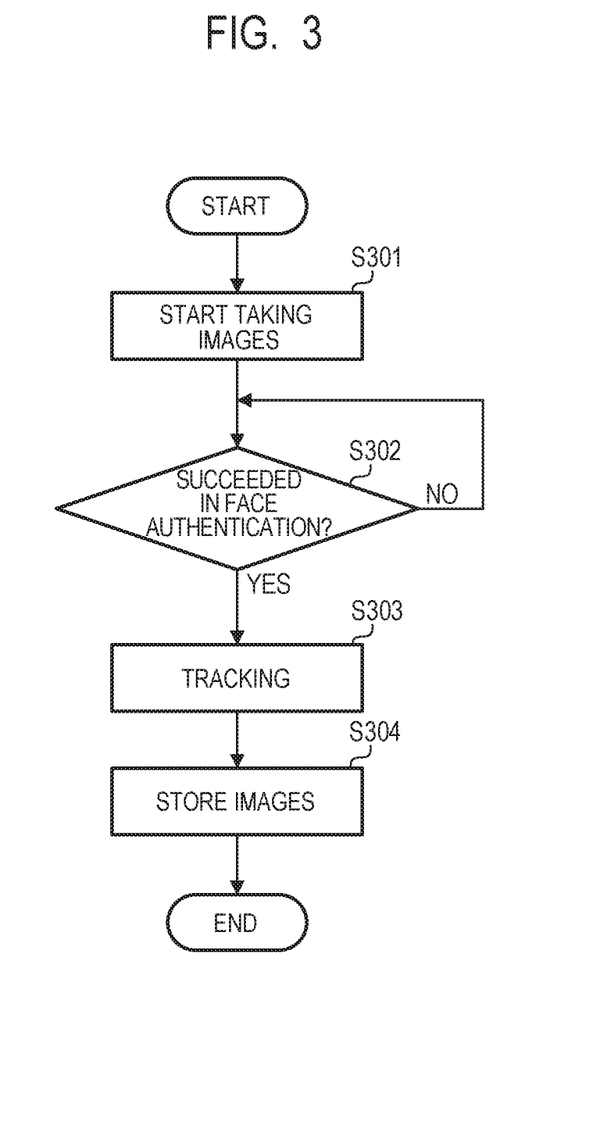
FIG. 3 is a flow chart for illustrating operation of the image processing apparatus according to the first embodiment.

FIG. 3 is a flow chart for illustrating operation of the image processing apparatus 101 according to the first embodiment.

In Step S301, the CPU 206 controls respective functional blocks so that the moving image is started being taken with use of the image pickup device 107. The timing to start taking the image may be the time when the image processing apparatus 101 is powered on, for example. The timing to start taking the image is not limited thereto. For example, the image may be started being taken when the display 201 becomes ready to display an image. The image data, that is, each frame forming the moving image, acquired by the image pickup device 107 is sequentially stored in the buffer memory 105. As described above, the buffer memory 105 is used as a ring buffer. Therefore, when no more free memory space is available in the buffer memory 105, old image data is sequentially overwritten with new image data.

In Step S302, the CPU 206 executes face authentication processing using the authentication unit 103 on the image data acquired by the image pickup device 107. When the registered face image is not authenticated by the authentication unit 103, that is, when the authentication unit 103 does not succeed in face authentication (NO in Step S302), Step S302 is continued. When the authentication unit 103 succeeds in face authentication (YES in Step S302), the processing proceeds to Step S303.

In Step S303, the CPU 206 executes tracking using the tracking unit 104. Tracking is performed on the object authenticated by the authentication unit 103. Tracking for the object is executed by the tracking unit 104 on previous images that have been acquired by the image pickup device

107 before the time point at which the object is authenticated by the authentication unit 103 and have already been stored in the buffer memory 105. As described above, tracking for the object is performed by the tracking unit 104 in reverse chronological order starting from the time point at which the object is authenticated by the authentication unit 103 in the image that has most recently been acquired by the image pickup device 107. When the object authenticated by the authentication unit 103 is included in the image, the tracking unit 104 generates metadata containing the information indicating that the object is included, and the information indicating that the image is an image extracted in tracking by the tracking unit 104. The thus-generated metadata is stored in the storage device 106 in association with the image when the image is stored in the storage device 106. The metadata may not be generated at this stage. For example, the metadata may be generated in Step S304, which is to be described below.

Figures 8A, 8B:
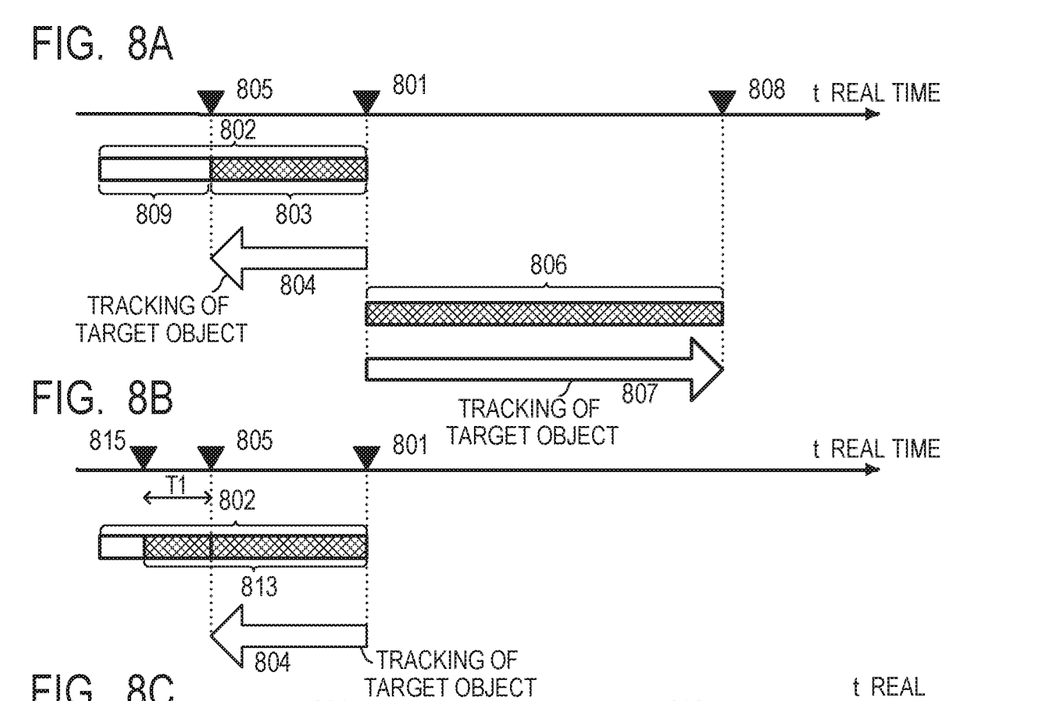
FIG. 8A, FIG. 8B, FIG. 8C, and FIG. 8D are charts for showing images stored in each of a first storage device and a second storage device.

In Step S304, the CPU 206 stores the image data, that is, each frame forming the moving image, in the storage device 106. The image data to be stored in the storage device 106 is the following image data. Specifically, as shown in FIG. 8A, of image data 802 that has already been acquired by the image pickup device 107 before a time point 801 at which the object is authenticated and has been stored in the buffer memory 105, image data 803 to a time point 805 beyond which the target object is untrackable in tracking 804 by the tracking unit 104 is stored in the storage device 106. In other words, the image data 802 stored in the buffer memory 105 is sequentially overwritten with new image data and erased, but the image data 803 of the image data 802 remains by being moved or copied to the storage device 106. Meanwhile, image data 809 before the time point 805 is erased from the buffer memory 105 without being stored in the storage device 106. Moreover, of the image data sequentially acquired by the image pickup device 107 after the authentication unit 103 succeeds in authentication of the object, image data 806 acquired by a time point 808 beyond which the object is untrackable in tracking 807 by the tracking unit 104 is to be stored in the storage device 106. The CPU 206 edits those pieces of image data and the above-mentioned metadata so that those pieces of image data and the above-mentioned metadata satisfy a predetermined file format, and performs control so as to store in the storage device 106 a moving image file obtained by the editing.

As described above, according to the first embodiment, the image data sequentially acquired by the image pickup device 107 is stored in the buffer memory 105. Then, tracking is executed on stored image data that has already been stored in the buffer memory 105 at the time point at which the object is authenticated, to thereby extract image data in which the object is included. Therefore, according to the first embodiment, storage control can be performed such that not only the images acquired after the time point at which the object is authenticated but also the images of the object that have been acquired before the object is authenticated are stored in the storage device 106.

Second Embodiment

Figure 4:
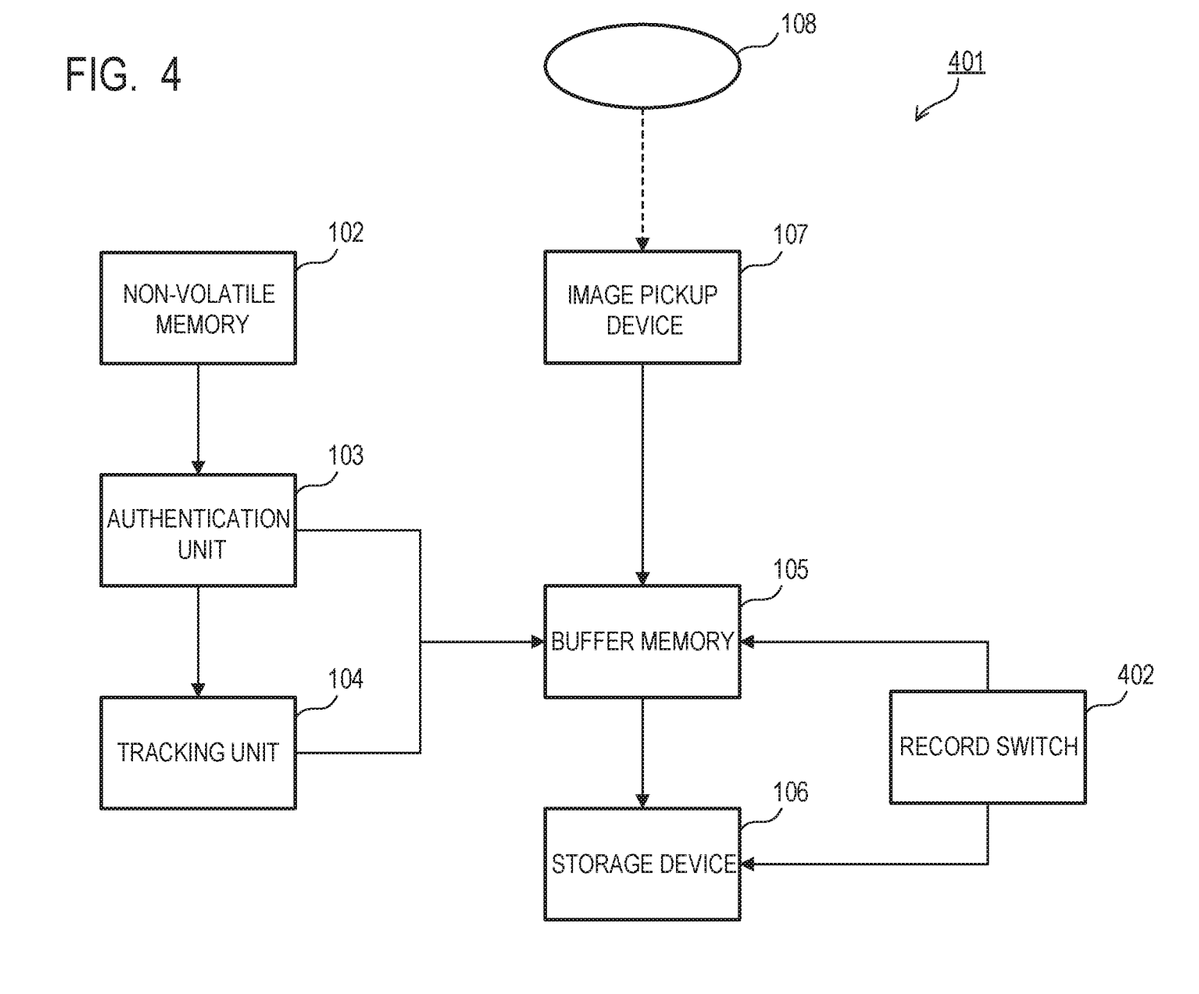
FIG. 4 is a block diagram for illustrating an image processing apparatus according to a second embodiment of the present invention.

An image processing apparatus and an image processing method according to a second embodiment of the present invention are described with reference to the drawings. FIG. 4 is a block diagram for illustrating the image processing apparatus according to the second embodiment. The same components as those of the image processing apparatus according to the first embodiment illustrated in FIG. 1 to FIG. 3 are denoted by the same reference symbols, and a description thereof is omitted or simplified.

An image processing apparatus 401 according to the second embodiment writes the image data including the object authenticated by the authentication unit 103 in the storage device 106 in a case where a record switch 402 is on.

As illustrated in FIG. 4, the image processing apparatus 401 according to the second embodiment includes a non-volatile memory 102, an authentication unit 103, a tracking unit 104, a buffer memory 105, an image pickup device 107, and the record switch 402. The image processing apparatus 401 also includes a controller (not shown), which is configured to control respective units. The image processing apparatus 401 includes an image pickup optical system 108, that is, a lens unit. The image pickup optical system 108 may or may not be removable from the image processing apparatus 401. The image processing apparatus 401 includes a storage device 106. The storage device 106 may or may not be removable from the image processing apparatus 401.

The record switch 402 is used to set whether to store, that is, record image data in the storage device 106. In a case where the record switch 402 is off, even when the object is authenticated by the authentication unit 103, the image data including the object is not written into the storage device 106. It should be noted, however, that even in a case where the record switch 402 is off, storage of the image data acquired by the image pickup device 107 in the buffer memory 105 is not suspended, and authentication processing by the authentication unit 103 and tracking by the tracking unit 104 are also performed as appropriate. In the case where the record switch 402 is on, the image data including the object authenticated by the authentication unit 103 is written into the storage device 106. The record switch 402 may be embodied by the operation device 204 illustrated in FIG. 2, for example.

Figure 5:
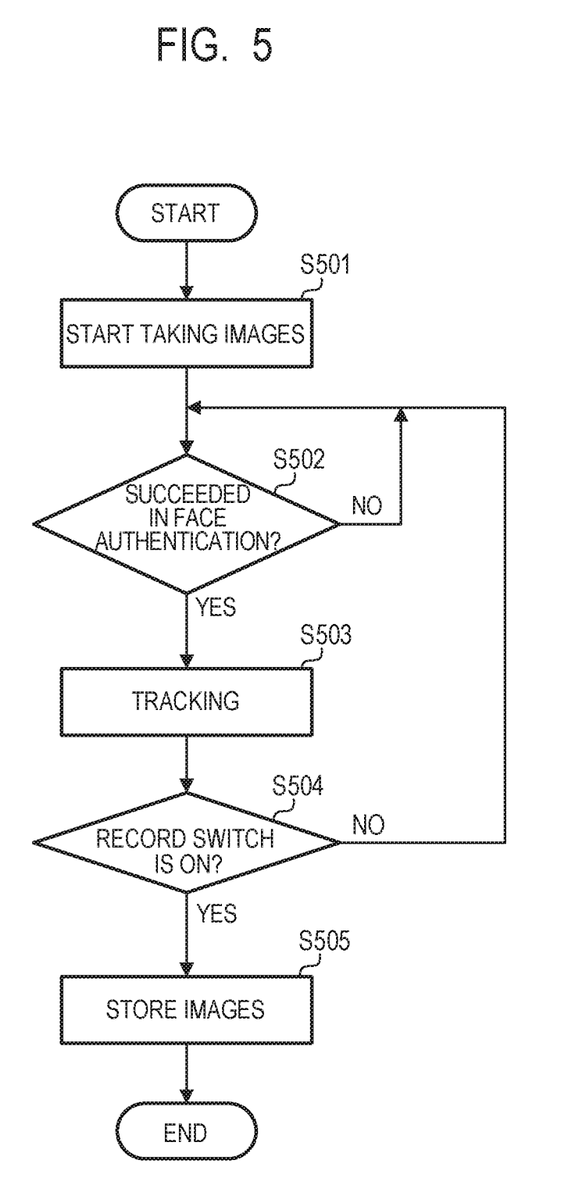
FIG. 5 is a flow chart for illustrating operation of the image processing apparatus according to the second embodiment.

FIG. 5 is a flow chart for illustrating operation of the image processing apparatus according to the second embodiment.

First, Step S501 to Step S503 are similar to Step S301 to Step S303 described above with reference to FIG. 3, and hence a description thereof is omitted.

In the case where the record switch 402 is on (YES in Step S504), the processing proceeds to Step S505. Meanwhile, in the case where the record switch 402 is off (NO in Step S504), the processing returns to Step S502.

Step S505 is similar to Step S304 described above with reference to FIG. 3, and hence a description thereof is omitted.

As described above, the image data including the object authenticated by the authentication unit 103 may be written into the storage device 106 in the case where the record switch 402 is on.

Third Embodiment

Figure 6:
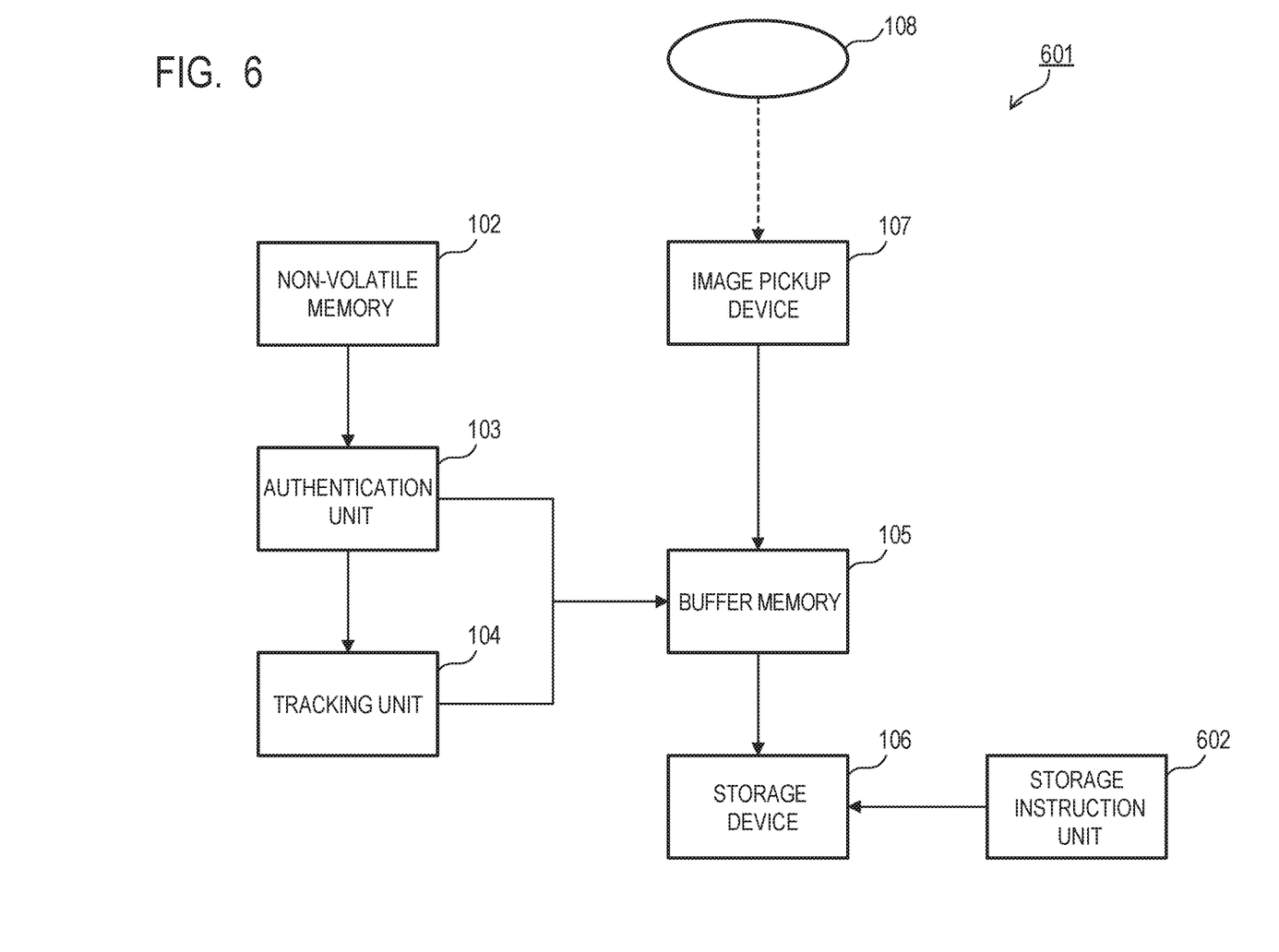
FIG. 6 is a block diagram for illustrating an image processing apparatus according to a third embodiment of the present invention.

An image processing apparatus and an image processing method according to a third embodiment of the present invention are described with reference to the drawings. FIG. 6 is a block diagram for illustrating the image processing apparatus according to the third embodiment.

As illustrated in FIG. 6, an image processing apparatus 601 according to the third embodiment includes a non-volatile memory 102, an authentication unit 103, a tracking unit 104, a buffer memory 105, an image pickup device 107, and a storage instruction unit 602. The image processing apparatus 601 also includes a controller (not shown), which is configured to control respective units. The image processing apparatus 601 includes an image pickup optical system 108, that is, a lens unit. The image pickup optical system 108 may or may not be removable from the image processing apparatus 601. The image processing apparatus 601 includes a storage device 106. The storage device 106 may or may not be removable from the image processing apparatus 601.

The storage instruction unit (instruction unit) 602 is used by the user to instruct the image processing apparatus 601 whether to store the image data stored in the storage device 106. When the user operates the storage instruction unit 602 so that the image data is stored, the CPU 206 performs control so as to maintain a state in which the image data is stored in the storage device 106 without erasing the image data from the storage device 106. When the user operates the storage instruction unit 602 so that the image data is erased, the CPU 206 performs control so as to erase the image data from the storage device 106. In this manner, a storage capacity of the storage device 106 can be prevented from being unnecessarily consumed, and image data that is unnecessary to the user can also be prevented from being accumulated in the storage device 106. The storage instruction unit 602 may be implemented by the operation device 204 illustrated in FIG. 2, for example.

Figure 7:
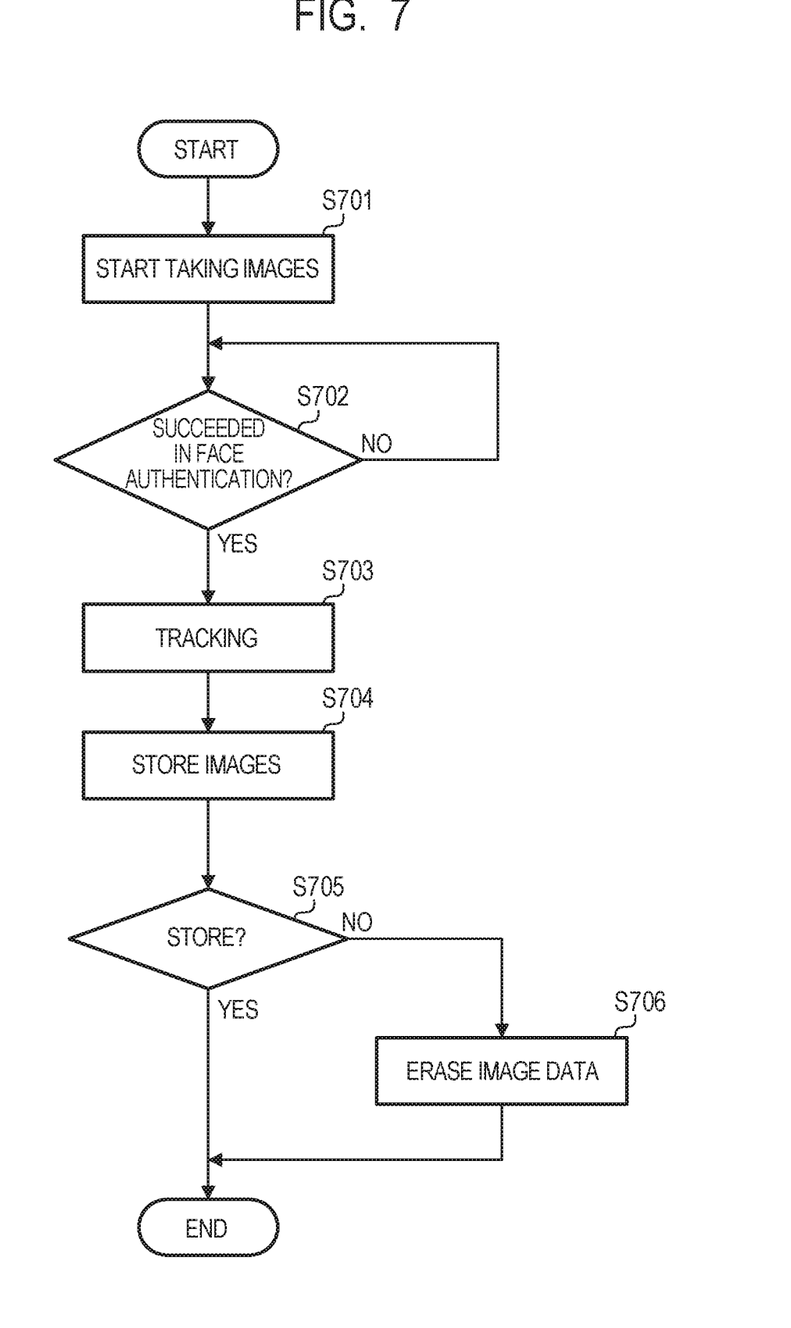
FIG. 7 is a flow chart for illustrating operation of the image processing apparatus according to the third embodiment.

FIG. 7 is a flow chart for illustrating operation of the image processing apparatus according to the third embodiment.

Step S701 to Step S704 are similar to Step S301 to Step S304 described above with reference to FIG. 3, and hence a description thereof is omitted.

When the user operates the storage instruction unit 602 so that the image data stored in the storage device 106 is stored (YES in Step S705), the CPU 206 performs control so as not to erase the image data from the storage device 106. In other words, the CPU 206 performs control so as to maintain the state in which the image data is stored in the storage device 106. Meanwhile, when the user operates the storage instruction unit 602 so that the image data stored in the storage device 106 is erased (NO in Step S705), the CPU 206 performs control so as to erase the image data from the storage device 106 (Step S706).

As described above, the image data including the object authenticated by the authentication unit 103 may be stored in the storage device 106 based on the instruction to store by the user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. Parts of the above-mentioned embodiments may be combined as appropriate.

In the above-mentioned embodiments, there has been described as an example the case in which the tracking 804 is performed for the image data 802 stored in the buffer going back in time from the time point 801 at which the object is authenticated, and the image data 803 that has been acquired after the time point 805 beyond which the object is untrackable and has been stored in the buffer is stored in the storage device 106. However, the present invention is not limited thereto. For example, as shown in FIG. 8B, image data 813 that has been acquired after a time point 815 that is predetermined time T1 before the time point 805 beyond which the object is untrackable and has been stored in the buffer may be stored in the storage device 106. In this manner, potential images in which the object is photographed but which have failed in tracking for the object can also be recorded, and it is possible to prevent a circumstance in which the images are not recorded although the images include the object. In this manner, of the images that have already been stored in the buffer memory 105 at the time point at which the object is authenticated by the authentication unit 103, images for the predetermined time before the target object is tracked may also be stored in the storage device 106.

Figures 8C, 8D:
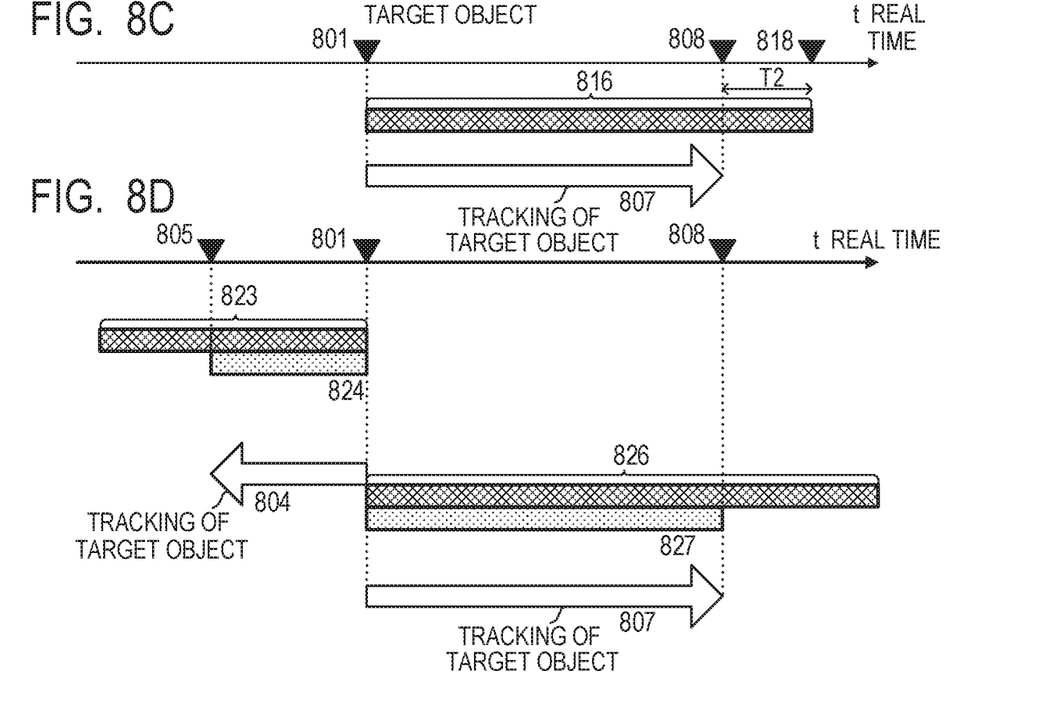

Moreover, in the above-mentioned embodiments, there has been described as an example the case in which, of the image data that has been acquired after the time point 801 at which the authentication unit 103 succeeded in authentication, the image data 806 that has been acquired by the time point 808 beyond which the object is untrackable in tracking 807 is stored in the storage device 106. However, the present invention is not limited thereto. For example, as shown in FIG. 8C, of the image data acquired after the time point 801 at which the authentication unit 103 succeeded in authentication of the object, image data up to a time point 818 that is predetermined time T2 after the time point 808 beyond which the object is untrackable in tracking 807 may be stored in the storage device 106. In this manner, potential images in which the object is photographed but which have failed in tracking for the object can also be recorded, and it is possible to prevent a circumstance in which the images are not recorded although the images include the object. In this manner, of the images acquired after the time point at which the object is authenticated by the authentication unit 103, images for the predetermined time after the target object is not tracked any more may also be stored in the storage device 106.

Moreover, in the above-mentioned embodiments, there has been described as an example the case in which image data 803 and 806 in a period in which the target object is tracked are stored in the storage device 106, but the present invention is not limited thereto. For example, as shown in FIG. 8D, image data 826 after the time point 801 at which the target object is authenticated and also including a period in which the target object is not tracked may be stored in the storage device 106, and the image data 826 may be stored in association with metadata 827 containing information indicating that the object is included for the period in which the target object is tracked. Moreover, image data 823 that has been stored in the buffer memory 105 at the time point 801 at which the target object is authenticated may be stored in the storage device 106, and the image data 823 may be stored in association with metadata 824 containing information indicating that the object is included for the period in which the target object is successfully tracked. Then, images for the periods in which the target object is tracked may be extracted in accordance with the metadata 827 and 824 from the image data 826 and 823 recorded as described above, and the images may be played, with the result that the user can see images of a part including the target object.

This application claims the benefit of Japanese Patent Application No. 2017-072560, filed Mar. 31, 2017, which is hereby incorporated by reference wherein in its entirety.

What is claimed is:

1. An image processing apparatus, comprising:
an acquisition unit configured to sequentially acquire images;
an object recognition unit configured to recognize a target object in the images sequentially acquired by the acquisition unit;
a tracking unit configured to perform tracking on the images sequentially acquired by the acquisition unit for the target object recognized by the object recognition unit in response to the object recognition unit recognizing the target object; and
a storage controller configured to control so as to store in a first storage device the images sequentially acquired by the acquisition unit,
wherein the tracking unit further performs tracking for the target object on stored images, that are acquired by the acquisition unit before the target object is recognized by the object recognition unit in the images sequentially acquired by the acquisition unit, and are stored in the first storage device,
wherein the storage controller controls so as to store in a second storage device that is different from the first storage device, images in which the target object is tracked by the tracking unit of the images sequentially acquired by the acquisition unit, and images in which the target object is tracked by the tracking unit of the stored images, and
wherein tracking for the target object is performed in reverse chronological order starting from most recently acquired images before a time point at which the target object is recognized by the object recognition unit.

2. An image processing apparatus according to claim 1, wherein the storage controller controls so as to erase, from the first storage device, images of the stored images in which the target object is not tracked by the tracking unit, without storing the images in the second storage device.

3. An image processing apparatus according to claim 1, wherein the storage controller sequentially overwrites images stored in the first storage device with new images that are sequentially acquired.

4. An image processing apparatus according to claim 1, wherein the storage controller sequentially erases images stored in the first storage device.

5. An image processing apparatus according to claim 1, wherein the storage controller controls so as to store in the second storage device, of images that are acquired by the acquisition unit before the target object is recognized by the object recognition unit in the images sequentially acquired by the acquisition unit and are stored in the first storage device, images for a predetermined time before the time point to which the target object is trackable.

6. An image processing apparatus according to claim 1, wherein the storage controller stores in the second storage device, of the images sequentially acquired by the acquisition unit, images for a predetermined time after the time point to which the target object is trackable by the tracking unit.

7. An image processing apparatus according to claim 1, wherein the tracking unit performs tracking for the target object on the stored images that are stored in the first storage device in order from most recently acquired images.

8. An image processing apparatus according to claim 1, wherein the object recognition unit recognizes the target object based on a face image that is registered in advance.

9. An image processing apparatus according to claim 1, wherein the tracking unit performs tracking an object that is located on an extended line of a locus of the target object recognized by the object recognition unit, and that satisfies a predetermined condition.

10. An image processing apparatus according to claim 1, wherein the tracking unit performs tracking an object having differences in position and shape that are within a predetermined level from the target object recognized by the object recognition unit.

11. An image processing apparatus according to claim 1, wherein the storage controller stores the images in the second storage device when a predetermined instruction is issued by a user.

12. An image processing apparatus according to claim 1, further comprising an instruction unit configured to instruct whether to store an image,
wherein, when an instruction not to store an image is issued from the instruction unit, the storage controller controls so as to erase the image from the second storage device.

13. An image processing apparatus according to claim 1, wherein the acquisition unit sequentially acquires the images using an image pickup device.

14. An image processing apparatus according to claim 1, further comprising a generation unit configured to generate an image file based on the images in which the target object is tracked by the tracking unit of the images sequentially acquired by the acquisition unit, and the images in which the target object is tracked by the tracking unit of the stored images,
wherein the storage controller controls so as to store in the second storage device the image file generated by the generation unit.

15. An image processing method, comprising:
sequentially acquiring images;
recognizing a target object in the images sequentially acquired in the sequentially acquiring;
performing tracking on the images sequentially acquired in the sequentially acquiring for the target object recognized in the recognizing in response to the object recognition unit recognizing the target object;
controlling so as to store in a first storage device the images sequentially acquired in the sequentially acquiring;

performing tracking for the target object on stored images, that are acquired before the target object is recognized in the sequentially acquired images, and have been stored in the first storage device; and storing in a second storage device that is different from the first storage device, images in which the target object is tracked of the sequentially acquired images, and images in which the target object is tracked in the stored images;

wherein tracking for the target object is performed in reverse chronological order starting from most recently acquired images before a time point at which the target object is recognized in the recognizing step.

16. A non-transitory computer-readable storage medium storing a computer program which causes a computer to execute an image processing method, the method comprising:

sequentially acquiring images;

recognizing a target object in the images sequentially acquired in the sequentially acquiring;

performing tracking on the images sequentially acquired in the sequentially acquiring for the target object recognized in the recognizing in response to the object recognition unit recognizing the target object;

controlling so as to store in a first storage device the images sequentially acquired in the sequentially acquiring;

performing tracking for the target object on stored images, that are acquired before the target object is recognized in the sequentially acquired images, and have been stored in the first storage device; and storing in a second storage device that is different from the first storage device, images in which the target object is tracked of the sequentially acquired images, and images in which the target object is tracked in the stored images;

wherein tracking for the target object is performed in reverse chronological order starting from most recently acquired images before a time point at which the target object is recognized in the recognizing step.

17. An image processing apparatus according to claim 1, wherein tracking for the target object is continued for each the images sequentially acquired in the sequentially acquiring after a time point at which the target object is recognized by the object recognition unit.

* * * * *